No. 838,448. PATENTED DEC. 11, 1906.
LE ROY PITCHER.
PUMP ROD COUPLING.
APPLICATION FILED APR. 2, 1906.
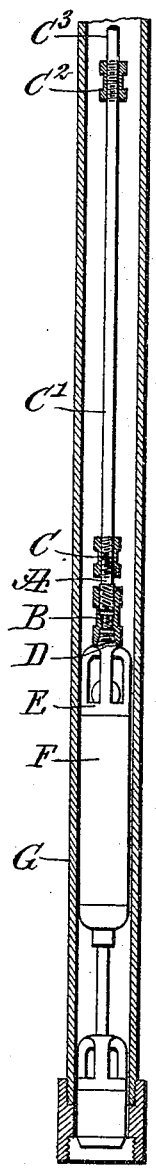
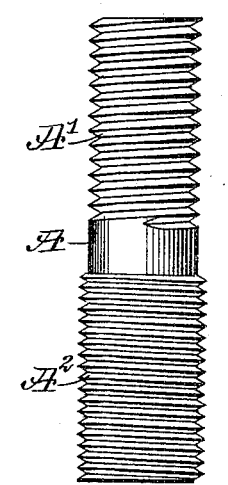
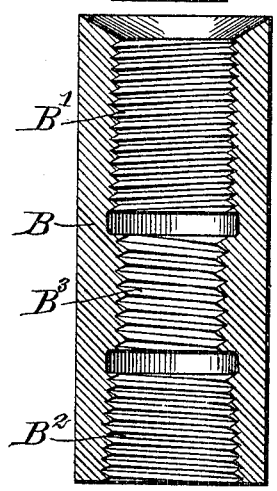
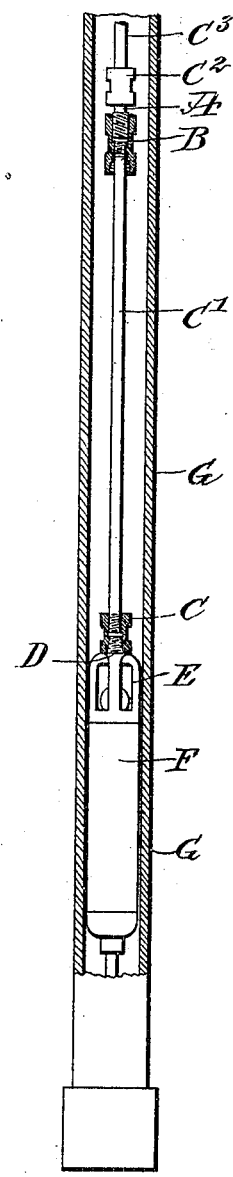
WITNESSES:
L. Almquist
Theo. G. Hoster
INVENTOR
Le Roy Pitcher
BY Munn & Co.
ATTORNEYS

UNITED STATES PATENT OFFICE.

LE ROY PITCHER, OF OILCENTER, CALIFORNIA.

PUMP-ROD COUPLING.

No. 838,448. Specification of Letters Patent. Patented Dec. 11, 1906.

Application filed April 2, 1906. Serial No. 309,455.

*To all whom it may concern:*

Be it known that I, LE ROY PITCHER, a citizen of the United States, and a resident of Oilcenter, in the county of Kern and State of California, have invented a new and Improved Pump-Rod Coupling, of which the following is a full, clear, and exact description.

The invention relates to oil-well and other pumps; and its object is to provide a new and improved pump-rod coupling arranged to permit the convenient disconnection of pump-rods from the pump to allow the withdrawal of the pump-rods without danger of disconnecting the pump-rod sections in case the pump-plunger is sanded up.

The invention consists of novel features and parts and combinations of the same, which will be more fully described hereinafter, and then pointed out in the claims.

A practical embodiment of the invention is represented in the accompanying drawings, forming a part of this specification, in which similar characters of reference indicate corresponding parts in all views.

Figure 1 is a sectional side elevation of the improvement as applied directly to the top cage of the pump-plunger. Fig. 2 is a like view of the improvement as applied to the pump-rod, one section above the pump-plunger. Fig. 3 is an enlarged side elevation of the coupling-rod. Fig. 4 is an enlarged sectional side elevation of the coupling nut or sleeve, and Fig. 5 is a plan view of the same.

The improved coupling consists, essentially, of a coupling-rod A and a nut or sleeve B, of which the coupling-rod A is provided at its upper end with a right-hand screw-thread $A'$ and at its lower end with a left-hand screw-thread $A^2$, and the said nut or sleeve B is provided at its upper end with a single left-hand screw-thread $B'$ and in its lower portion with two right-hand screw-threads $B^2$ $B^3$ of different bores or diameters. The screw-thread $A'$ of the coupling-rod A is adapted to screw into a coupling C, forming part of the entire pump-rod of the pump, and in the said coupling C screws the first pump-rod section $C'$, connected at its upper end with a coupling $C^2$, engaged by the next section $C^3$, and so on throughout the entire length of the pump-rod. It is understood that the several sections $C'$ $C^3$ of the pump-rod screw in the corresponding couplings C $C^2$, while the right-hand threads and the left-hand threads $A^2$ of the coupling-rod A screw into the corresponding threads $B'$ of the coupling nut or sleeve B. As illustrated in Fig. 1, the right-hand thread $B^2$ of the nut or sleeve B screws onto the threaded top D of a cage E, forming part of a plunger F, mounted to reciprocate in the casing G of the pump.

Now by the arrangement described it will be seen that the several sections of the pump-rod are connected with each other in the manner described, and the lowermost coupling C is connected by a right-hand thread with the coupling-rod A, which in turn screws by the left-hand threads $A^2$ into the corresponding threads $B'$ of the nut or sleeve B, and the latter again screws by the right-hand screw-threads $B^2$ onto the top B of the cage E. Now when the plunger F is sanded up in the casing G and it is desired to withdraw the pump-rod and leave the plunger F down in the casing G then it is only necessary for the operator to turn the upper end of the pump-rod in a left-hand direction to unscrew the screw-thread $A^2$ from the screw-thread $B'$ without danger of disturbing any of the joints of the pump-rod—that is, none of the pump-rod sections $C'$ $C^3$ will unscrew from the couplings C $C^2$, nor can the screw-threads $A'$ unscrew from the coupling C. In a like manner the nut or sleeve B cannot unscrew from the end D of the cage E as long as the pump-rod is turned in the direction indicated, and hence an easy unscrewing of the threads $A^2$ from the threads $B'$ takes place.

In order to facilitate the easy unscrewing of the threads $A^2$ from the threads $B'$, I prefer to make the pitch of the threads $A^2$ $B'$ somewhat less than that of the screw-threads $A'$ and those of the pump-rod sections $C'$ $C^3$ and the couplings C $C^2$. In some cases the plunger F and the first plunger or section $C'$ becomes sanded up, and in order to withdraw the pump-rod minus the plunger F from the said first pump-rod section $C'$ it is desirable to connect the nut or sleeve B with the upper end of the first pump-rod section $C'$, as illustrated in Fig. 2. In this case the first coupling C is screwed onto the top D of the cage E and is engaged by the first pump-rod section $C'$, the upper threaded end of which screws into the screw-threads $B^3$, formed in the nut or sleeve B between the threads $B'$ $B^2$. The coupling-rod A in this case engages with its threads $A^2$. The threads B' and the threads A' of the coupling-rod A screw into the second coupling C², connected with the second section C³ of the pump-rod. The operation in this case is the same as above described in reference to Fig. 1, with the only difference that when the pump-rod is turned in a left-hand direction then the thread A² unscrews from the thread B' of the nut or sleeve B, held stationary on the upper end of the first pump-rod section C'.

The device is very simple and durable in construction and is composed of but few parts not liable to get easily out of order.

Having thus described my invention, I claim as new and desire to secure by Letters Patent—

1. A pump-rod coupling comprising a coupling-nut having a right-hand thread and a left-hand thread, and a coupling-rod having a right-hand thread and a left-hand thread, the left-hand screwing in the corresponding thread of the said coupling-nut and the right-hand thread adapted to screw into a pump-rod coupling, the said right-hand thread of the said coupling-nut being adapted to engage the threaded end of a pump-plunger or the first plunger-rod section.

2. A pump-rod coupling comprising a coupling-rod having a right-hand screw-thread and a left-hand screw-thread, of which screw-threads the right-hand screw-thread is adapted to engage a coupling of a pump-rod, and a coupling-nut having a left-hand screw-thread engaged by the corresponding left-hand thread of the said coupling-rod, the said coupling-nut also having two right-hand threads of different diameters adapted to engage the threaded ends of a plunger or the first section of a plunger-rod.

3. A pump-rod coupling comprising a coupling-rod having a right-hand screw-thread and a left-hand screw-thread of less pitch than the right-hand screw-thread, and of which screw-threads the right-hand screw-thread is adapted to engage a coupling of a pump-rod, and a coupling-nut having a left-hand screw-thread engaged by the corresponding left-hand thread of the said coupling-rod, the said coupling-nut also having two right-hand threads of different diameters adapted to engage the threaded ends of a plunger or the first section of a plunger-rod.

In testimony whereof I have signed my name to this specification in the presence of two subscribing witnesses.

LE ROY PITCHER.

Witnesses:
A. WEABER,
N. L. BAKER.